US011933263B2

(12) United States Patent
Okano et al.

(10) Patent No.: US 11,933,263 B2
(45) Date of Patent: Mar. 19, 2024

(54) WIND TURBINE BLADE WITH PROTECTING LAYERS

(71) Applicant: MITSUBISHI HEAVY INDUSTRIES, LTD., Tokyo (JP)

(72) Inventors: Yasushi Okano, Tokyo (JP); Masaaki Shibata, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 17/181,426

(22) Filed: Feb. 22, 2021

(65) Prior Publication Data

US 2021/0262434 A1 Aug. 26, 2021

(30) Foreign Application Priority Data

Feb. 26, 2020 (JP) ................. 2020-030070

(51) Int. Cl.
*F03D 1/06* (2006.01)
*F03D 80/30* (2016.01)

(52) U.S. Cl.
CPC ........... *F03D 1/0675* (2013.01); *F03D 80/30* (2016.05); *F05B 2230/31* (2013.01); *F05B 2280/1072* (2013.01); *F05B 2280/1073* (2013.01); *F05B 2280/20041* (2013.01); *F05B 2280/20043* (2013.01); *F05B 2280/20071* (2013.01); *F05B 2280/20083* (2013.01); *F05B 2280/6011* (2013.01)

(58) Field of Classification Search
CPC ......... F03D 80/30; F03D 80/40; F03D 1/0675
See application file for complete search history.

(56) References Cited

U.S. PATENT DOCUMENTS 6,612,810 B1 * 9/2003 Olsen ............... F03D 80/40 415/908
7,654,790 B2 * 2/2010 Molbech ............ H02G 13/80 415/1

(Continued)

FOREIGN PATENT DOCUMENTS

EP 3447284 A1 * 2/2019 ............ F03D 80/40
EP 3447284 A1 2/2019

(Continued)

OTHER PUBLICATIONS

NPL Fluorinated Ethylene Propylene; Wikipedia; Sep. 21, 2019. see p. 1 (Year: 2019).*

(Continued)

*Primary Examiner* — J. Todd Newton
*Assistant Examiner* — Wesley Le Fisher
(74) *Attorney, Agent, or Firm* — Manabu Kanesaka; Benjamin Hauptman; Kenneth Berner (57) ABSTRACT

A wind turbine blade is provided, which includes a blade body extending from a blade root toward a blade tip along a blade length direction, a first sprayed layer disposed so as to cover at least a leading edge on a side of the blade tip of the blade body, for suppressing erosion of the leading edge of the blade body, a second sprayed layer formed between the blade body and the first sprayed layer, and having a lower electrical resistivity than the first sprayed layer, and a first conductive part for electrically connecting the second sprayed layer to a ground.

11 Claims, 9 Drawing Sheets

(56) References Cited

U.S. PATENT DOCUMENTS

| | | | | |
|---|---|---|---|---|
| 7,896,616 | B2* | 3/2011 | Livingston | F03D 80/30 |
| | | | | 416/224 |
| 9,450,392 | B2* | 9/2016 | Erichsen | F03D 80/30 |
| 9,709,039 | B2* | 7/2017 | Lyngby | F03D 80/50 |
| 10,844,843 | B2 | 11/2020 | Fujioka et al. | |
| 2009/0053062 | A1* | 2/2009 | Arinaga | H02G 13/40 |
| | | | | 416/146 R |
| 2011/0142678 | A1* | 6/2011 | Santiago | F03D 80/30 |
| | | | | 416/241 R |
| 2011/0287239 | A1 | 11/2011 | Nardi et al. | |
| 2013/0071252 | A1* | 3/2013 | Nissen | B05D 1/02 |
| | | | | 416/224 |
| 2014/0093378 | A1 | 4/2014 | Clavette et al. | |
| 2016/0348643 | A1* | 12/2016 | Fujioka | F03D 80/50 |
| 2018/0073121 | A1* | 3/2018 | Habu | C08J 7/043 |
| 2019/0233675 | A1* | 8/2019 | Chen | C09D 7/20 |
| 2020/0232445 | A1* | 7/2020 | Lindskog | B29C 73/34 |
| 2021/0262350 | A1* | 8/2021 | Mathew | F03D 1/0675 |
| 2022/0264704 | A1* | 8/2022 | He | H05B 3/286 |

FOREIGN PATENT DOCUMENTS

| | | | | |
|---|---|---|---|---|
| JP | 2001-240953 | A | 9/2001 | |
| JP | 2001-270015 | A | 10/2001 | |
| JP | 2003-301252 | A | 10/2003 | |
| JP | 2014-148984 | A | 8/2014 | |
| JP | 6421078 | B2 | 11/2018 | |
| WO | WO-2011080177 | A1 * | 7/2011 | F03D 1/0641 |

OTHER PUBLICATIONS

NPL Tungsten Carbide; Wikipedia; Feb. 10. 2020; see p. 3. (Year: 2020).*
English translation of EP3447284A1 (Year: 2019).*
Yao Huang, et al.; "Conductive Polymer Composites from Renewable Resources", published Jan. 22, 2019; (Year: 2019).*
The 1st Office Action dated Dec. 15, 2020, in JP application No. 2020-030070.
Europe Patent Office, "Search Report for European Patent Application No. 21152273.5," dated Jul. 16, 2021.

* cited by examiner

Blade length direction

Enlarged A portion

FIG. 5

Correlation between Young modulus/hardness of sprayed coating, and wear resistance and aggression against opposite material to be joined

FIG. 6

Comparison between candidate material for sprayed layer 36 and candidate material for sprayed layer 38

|  | Young modulus | Hardness | Electrical resistivity |
|---|---|---|---|
| Candidate material for first sprayed layer (36) | Reference (1) (high) | high | Reference (1) (high) |
| Candidate material for second sprayed layer (38) | Not greater than two-thirds (low) | low | Not greater than one-half (low) |

WIND TURBINE BLADE WITH PROTECTING LAYERS

RELATED APPLICATIONS

The present application is based on, and claims priority from, Japanese Application No. JP2020-030070 filed Feb. 26, 2020, the disclosure of which is hereby incorporated by reference herein in its entirety.

TECHNICAL FIELD

The present disclosure relates to a wind turbine blade.

BACKGROUND

In a wind turbine power generating apparatus harnessing wind power, in order to prevent damage to a wind turbine blade in the case of lightning strike on the wind turbine blade and the like, the wind turbine blade is provided with a receptor to be struck by lightning, and a lightning strike current flows to the ground (see Patent Document 1). On the other hand, it is known that the wind turbine blade is eroded by collision of foreign substances (such as rain drops and dust) in the air, and so-called erosion is caused on a leading edge side. Thus, a countermeasure is taken, such as forming an erosion resistant protective film on the wind turbine blade.

CITATION LIST

Patent Literature

Patent Document 1: JP6421078B

SUMMARY

If a wind turbine blade is coated with a metallic erosion resistant film, since the metallic coating is exposed on the surface of the wind turbine blade, a probability of lightning strike not on a receptor serving as a lightning induction part but on the erosion resistant film may increase. Thus, the erosion resistant film may suffer damage (such as dissolution loss, separation, or crack) due to, for example, a shock by lightning strike or a temperature increase by charging.

The present disclosure was made in view of the above, and an object of the present disclosure is to suppress damage to an erosion resistant film coating the surface of a wind turbine blade by rapidly releasing a lightning strike current from the erosion resistant film, if the erosion resistant film is struck by lightning.

In order to achieve the above-described object, a wind turbine blade according to the present disclosure includes a blade body extending from a blade root toward a blade tip along a blade length direction, a first sprayed layer disposed so as to cover at least a leading edge on a side of the blade tip of the blade body, for suppressing erosion of the leading edge of the blade body, a second sprayed layer formed between the blade body and the first sprayed layer, and having a lower electrical resistivity than the first sprayed layer, and a first conductive part for electrically connecting the second sprayed layer to a ground.

Note that the "ground" refers to a place where, in a wind turbine blade disposed on land or ocean, a current such as a lightning strike current generated in the wind turbine blade is finally discharged.

According to a wind turbine blade of the present disclosure, since a second sprayed layer having a low electrical resistivity is formed between a blade body and a first sprayed layer serving as an erosion resistant film, it is possible to rapidly flow a lightning strike current charging the first sprayed layer to the side of the ground via the second sprayed layer, making it possible to suppress damage to the first sprayed layer, the second sprayed layer, and the blade body.

DETAILED DESCRIPTION

Some embodiments of the present invention will be described below with reference to the accompanying drawings. It is intended, however, that unless particularly specified, dimensions, materials, shapes, relative positions and the like of components described in the embodiments or shown in the drawings shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, an expressions such as "comprising", "including", "having", "containing", and "constituting" one constitutional element are not intended to be exclusive of other constitutional elements.

Figure 1:
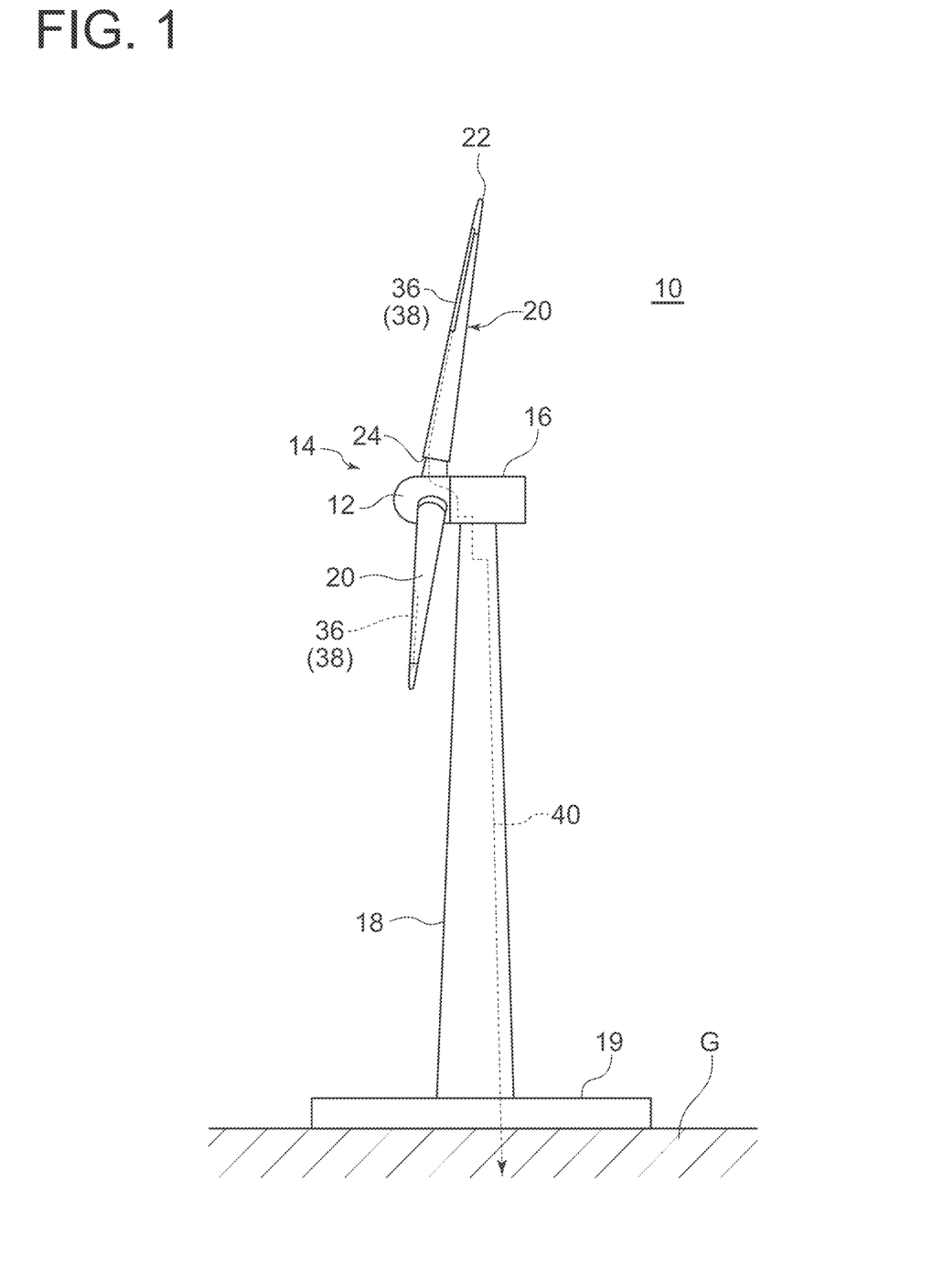
FIG. 1 is a view showing the overall configuration of a wind turbine power generating apparatus according to an embodiment.

FIG. 1 is a view showing the overall configuration of a wind turbine power generating apparatus 10.

As shown in FIG. 1, the wind turbine power generating apparatus 10 according to an embodiment includes at least one wind turbine blade 20, a hub 12 on which the wind turbine blade 20 is mounted, a generator (not shown) driven by a rotation of the hub 12, a nacelle 16 for supporting a rotor 14 including the wind turbine blade 20 and the hub 12, a tower 18 for supporting the nacelle 16, and a base 19 for supporting the tower 18 disposed on a ground G. For example, a plurality of (for example, three) wind turbine blades 20 are mounted on the hub 12 so as to be disposed in a radial fashion. Each wind turbine blade 20 has a blade tip 22 positioned radially outward around the hub 12 and a blade root 24 fixed to the hub 12. The tower 18 and the base 19 erect on land or ocean. FIG. 1 illustrates, as an embodiment, a case in which the wind turbine blade 20 is installed on land.

In the wind turbine power generating apparatus 10, the rotor 14 including the wind turbine blades 20 rotates in response to wind, the rotation of the rotor 14 is input to the generator (not shown), and power is generated in the generator.

Figure 2:
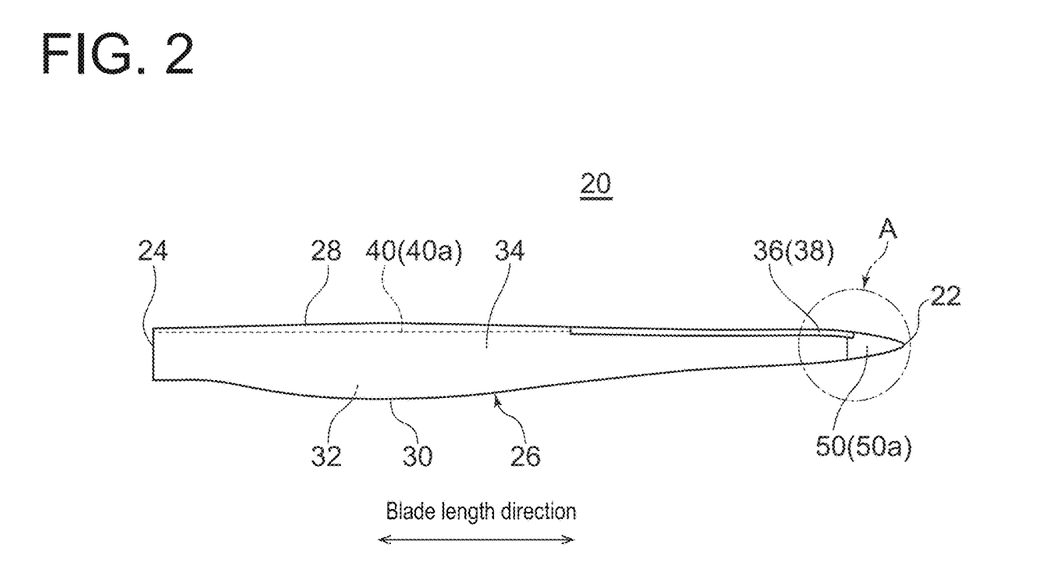
FIG. 2 is a planar view of a wind turbine blade according to an embodiment.
Figure 3:
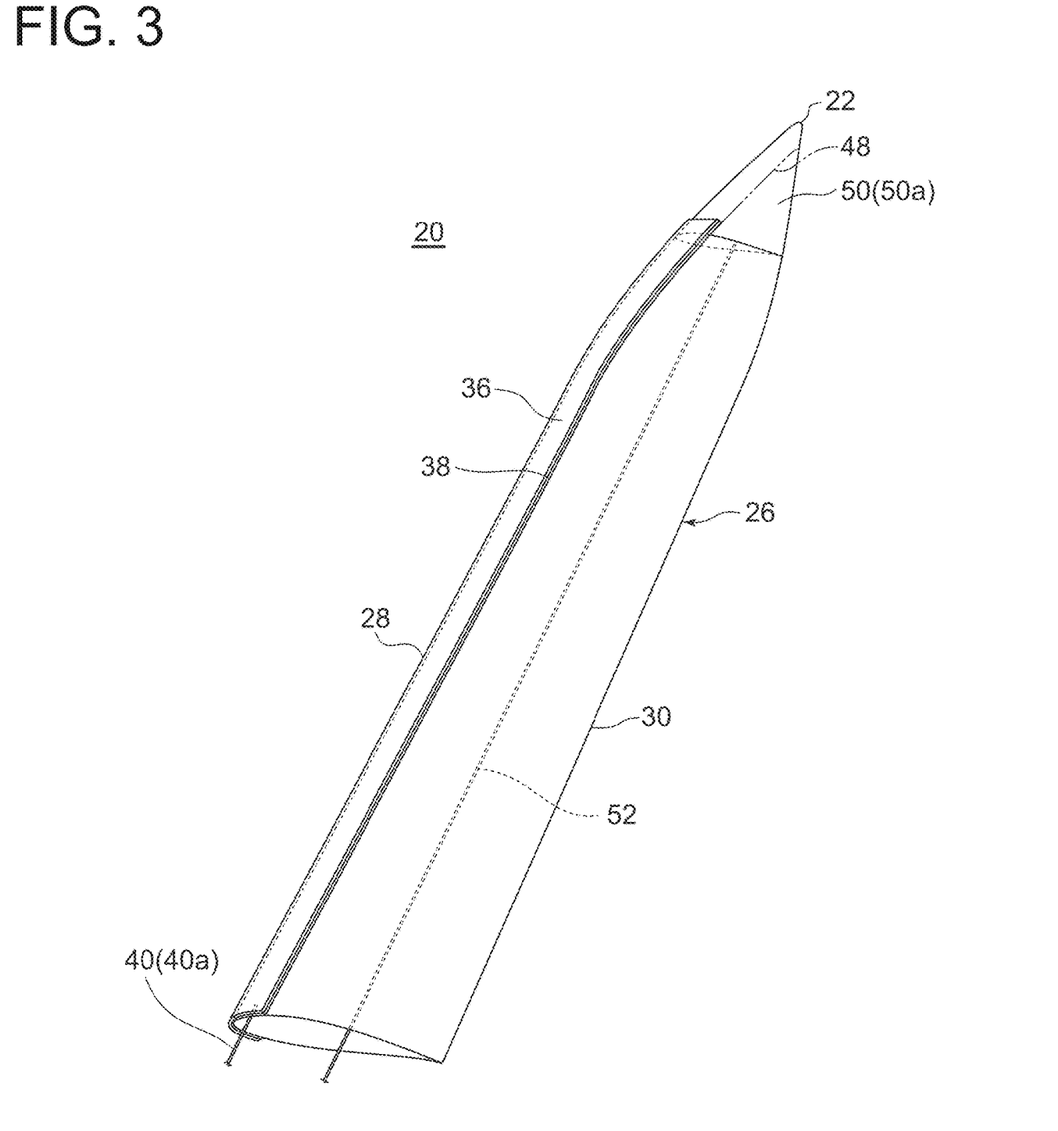
FIG. 3 is a perspective view showing a tip-side portion of the wind turbine blade according to an embodiment.
Figure 4:
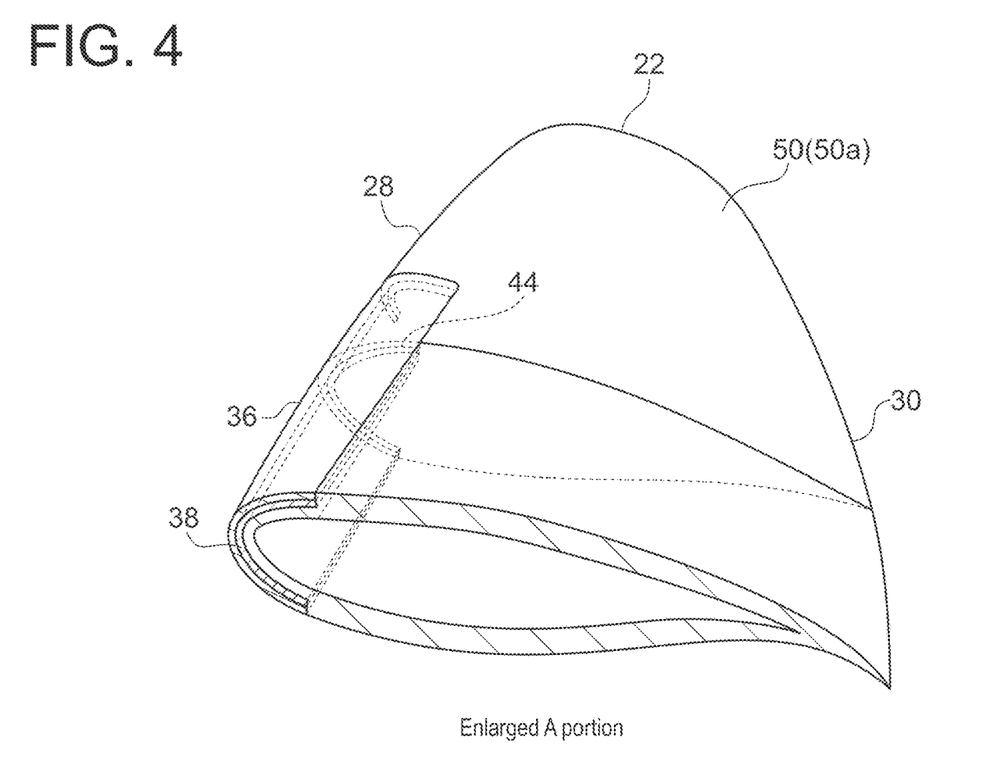
FIG. 4 is an enlarged perspective view of an A portion in FIG. 2.

Next, with reference to FIGS. 1 to 4, the wind turbine blade 20 according to an embodiment will be described. FIG. 2 is a planar view of the wind turbine blade 20 according to an embodiment. FIG. 3 is a perspective view of a blade-tip side portion of a blade body 26 shown in FIG. 2. FIG. 4 is a perspective view of a tip portion of the blade body 26 shown in FIG. 2.

As shown in FIG. 2, the wind turbine blade 20 includes the blade body 26 extending from the blade root 24 toward the blade tip 22 along a blade length direction. The blade body 26 has a leading edge 28, a trailing edge 30, a pressure surface 32 facing upstream in the rotational direction, and a suction surface 34 facing downstream in the rotational direction, thereby forming an airfoil. The blade body 26 includes, for example, a light-weight core material containing wood such as balsa wood, foaming resin such as polymethacrylimide (PMI), or a fiber-reinforced plastic material such as a carbon fiber-reinforced plastic or a glass fiber-reinforced plastic.

As shown in FIG. 3, on the blade body 26 of the wind turbine blade 20, a sprayed film 36 (first sprayed layer) is disposed so as to cover at least the leading edge 28 on the side of the blade tip 22 of the blade body 26, suppressing erosion of a leading-edge side portion. Moreover, between the blade body 26 and the sprayed film 36, a sprayed film 38 (second sprayed layer) having a lower electrical resistivity than the sprayed film 36 is disposed. The sprayed film 38 is connected to a conductive part 40 (first conductive part) another end of which extends to the side of the ground, and the sprayed film 38 is electrically connected to the side of the ground G via the conductive part 40.

If lightning strikes the sprayed film 36, since the sprayed film 38 having the lower electrical resistivity than the sprayed film 36 exists immediately below the sprayed film 36, it is possible to rapidly flow a lightning strike current charging the sprayed film 36 to the side of the ground G via the conductive part 40. Thus, it is possible to suppress damage to the sprayed film 38.

Figure 5:
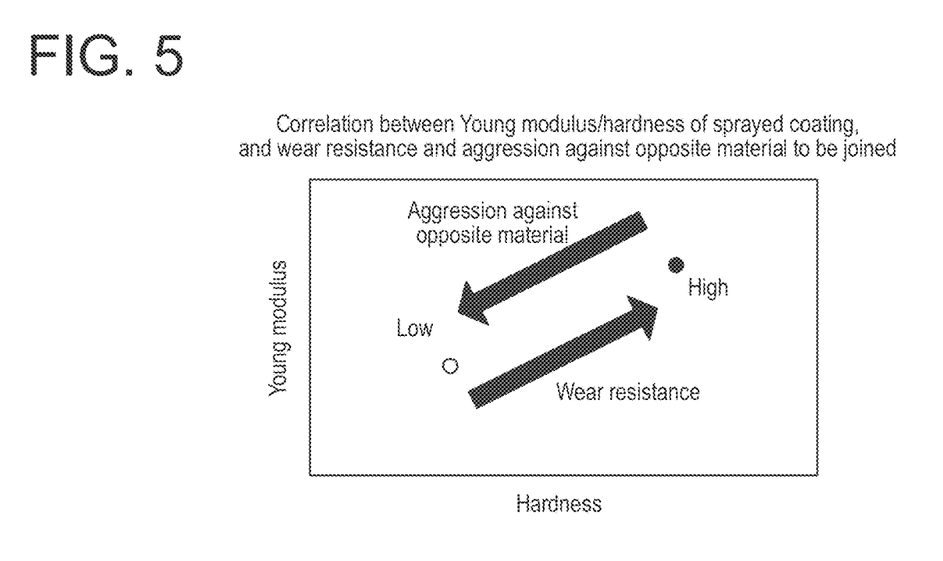
FIG. 5 is a view showing a correlation between Young modulus/hardness of a sprayed coating, and wear resistance and aggression against an opposite material to be joined.

In an embodiment, the sprayed film 38 is formed by a material having lower hardness and also having lower Young modulus than the sprayed film 36. FIG. 5 is a view showing a correlation between hardness and Young modulus of a sprayed coating, and wear resistance and aggression against an opposite material to be joined, and shows a test result in a certain document. FIG. 5 shows that aggression against the opposite material to be joined is low as the hardness and Young modulus of the sprayed coating are low, and aggression against the opposite material to be joined is high as the wear resistance of the sprayed coating is high. The above-described document selects, as thermal spray materials, tungsten carbide containing Co as a binder and a Cr-based oxidation-resistant material, and states a conclusion that, as a result of conducting a comparison test, aggression against the opposite material to be joined is low as the wear weight of the opposite material is small, there is the correlation between the Young modulus and hardness of the sprayed coating, and the wear resistance and aggression against the opposite material, and aggression against the opposite material is low as the hardness and Young modulus of the sprayed coating are low.

Furthermore, there is a number of documents regarding adhesiveness, and although there is a number of parameters influencing adhesiveness, low aggression against the opposite material is one of points in improving adhesiveness. From this result, since the sprayed film 38 has the lower hardness and also has lower Young modulus than the sprayed film 36, aggression against the blade body 26 is low, and adhesiveness to the blade body 26 is high. Thus, via the sprayed film 38, it is possible to suppress separation or dropout of the sprayed film 36 from the blade body 26.

In an embodiment, as shown in FIG. 3, the conductive part 40 is constituted by a down-conductor 40(40a). Thus, it is possible to rapidly flow the lightning strike current charging the sprayed film 36 to the side of the ground G via the sprayed film 38 and the down-conductor 40(40a).

Note that the sprayed film 38 need not necessarily be disposed all across the sprayed film 36. However, disposing the sprayed film 38 all across the sprayed film 36, it is possible to rapidly flow the lightning strike current charging the sprayed film 36 to the side of the ground G via the sprayed film 38.

As a thermal spraying method of the sprayed films 36 and 38, it is possible to use, for example, a gas thermal spraying method such as a plasma spraying method or a high-speed flame spraying method (high velocity oxy-fuel: HVOF).

Figure 6:
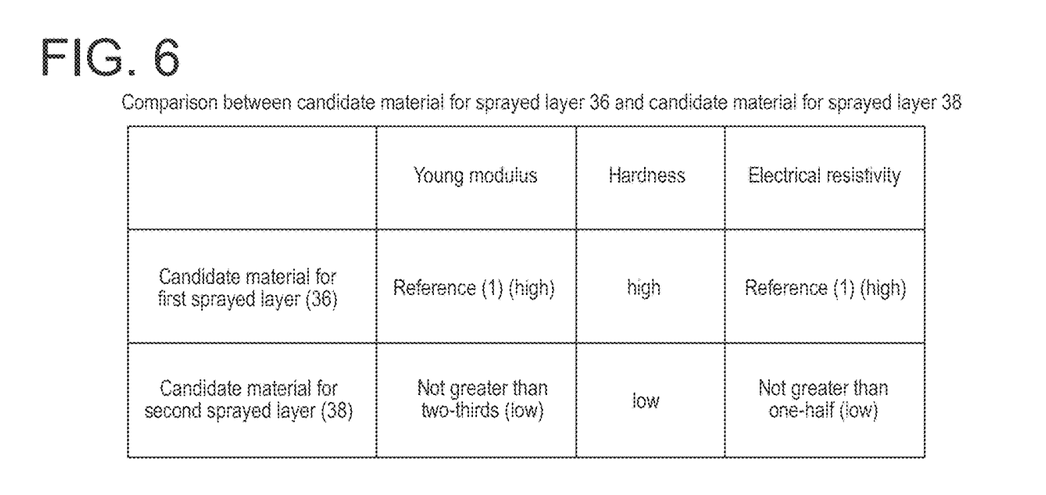
FIG. 6 is a table of a comparison of properties between a first sprayed layer candidate material and a second sprayed layer candidate material.

FIG. 6 shows an example of physical properties of candidate materials of the sprayed film 36 and the sprayed film 38. In this example, the materials forming the sprayed films 36 and 38 are, respectively, selected such that the electrical resistivity of the sprayed film 38 is not greater than one-half of that of the sprayed film 36. Thus, it is possible to give a conductive property for rapidly flowing the lightning strike current from the sprayed film 36. The material of the sprayed film 38 before thermal spray indicates the lower electrical resistivity after thermal spray. After thermal spray, although the sprayed film 38 adheres to the sprayed film 36 having the high electrical resistivity, and the electrical resistivity tends to increase due to, for example, an influence of an increase in porosity rate by thermal spray, it is possible to ensure the electrical resistivity of the sprayed film 38 which is one-half of that of the sprayed film 36. In the example shown in FIG. 6, Young modulus of the candidate material of the sprayed film 38 is not greater than two thirds of that of the candidate material of the sprayed film 36. Thus, it is possible to improve adhesiveness to the blade body 26.

Since erosion depends on the circumferential velocity of the blade body 26, the tip side of the blade body 26 having a high circumferential velocity is most likely to be influenced by erosion and is less likely to be influenced by erosion from the tip side toward the blade-root side. Therefore, applying thermal spray by selecting an appropriate circumferential velocity range in consideration of the lifetime of the blade body 26, it is possible to extend the lifetime against erosion. For example, as an embodiment, the sprayed films 36 and 38 are disposed on at least a part of a region from the blade tip 22 to one-half of the length of the blade body 26 in the length direction of the blade body 26.

For example, applying the sprayed films 36 and 38 in a range where the circumferential velocity of the blade body 26 is not less than about 50 m/s, it is possible to sufficiently increase the lifetime of the blade body 26 against erosion, for practical use. Alternatively, even if limited to a circumferential velocity range exceeding the above range, it is possible to extend the erosion resistant lifetime, making it possible to obtain a practically sufficient erosion resistant lifetime or to reduce a maintenance cost against erosion. Furthermore, using the conventional erosion resistant coating together for a portion having a low circumferential velocity, it is also possible to obtain a necessary lifetime while keeping down the cost.

Figure 7:
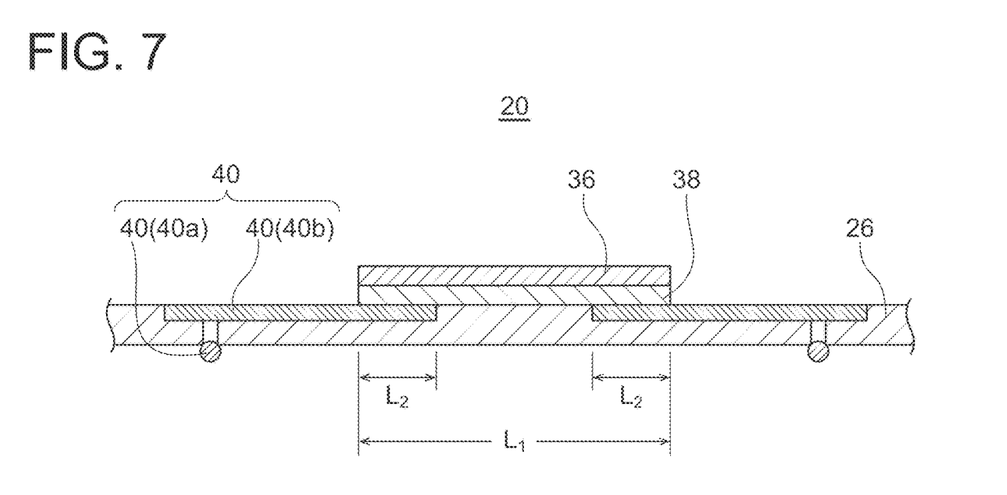
FIG. 7 is a cross-sectional view where a leading-edge side wall of the wind turbine blade is developed according to an embodiment.
Figure 8A:
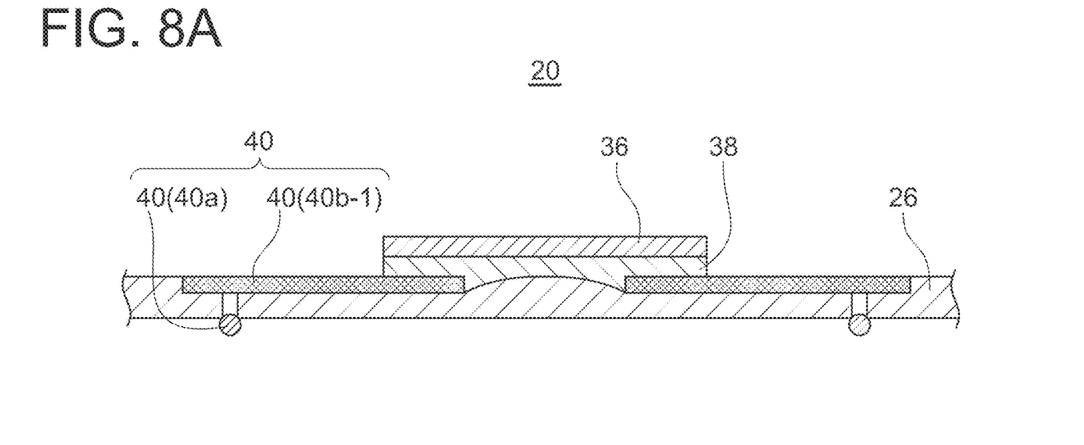
FIG. 8A is a cross-sectional view where the leading-edge side wall of the wind turbine blade is developed according to an embodiment.
Figure 8B:
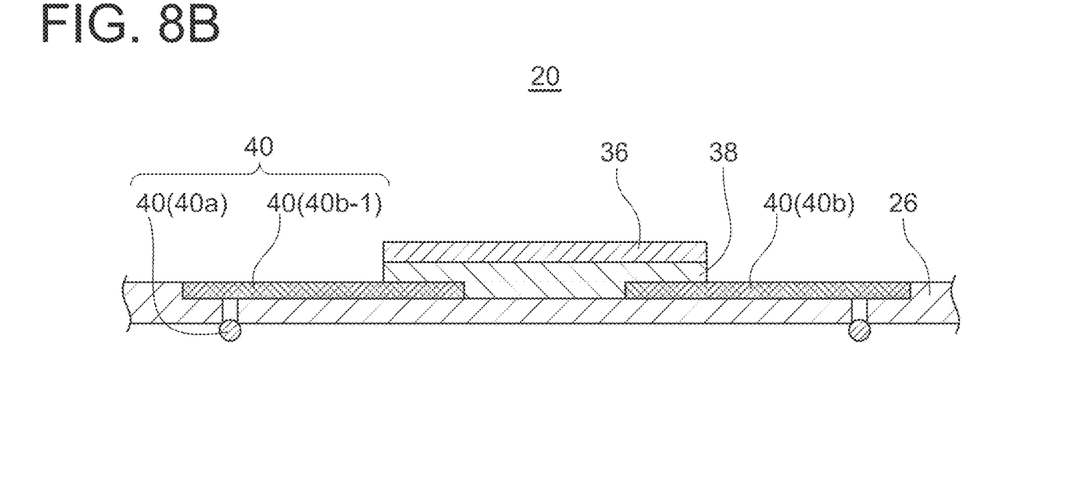
FIG. 8B is a cross-sectional view where the leading-edge side wall of the wind turbine blade is developed according to an embodiment.
Figure 9:
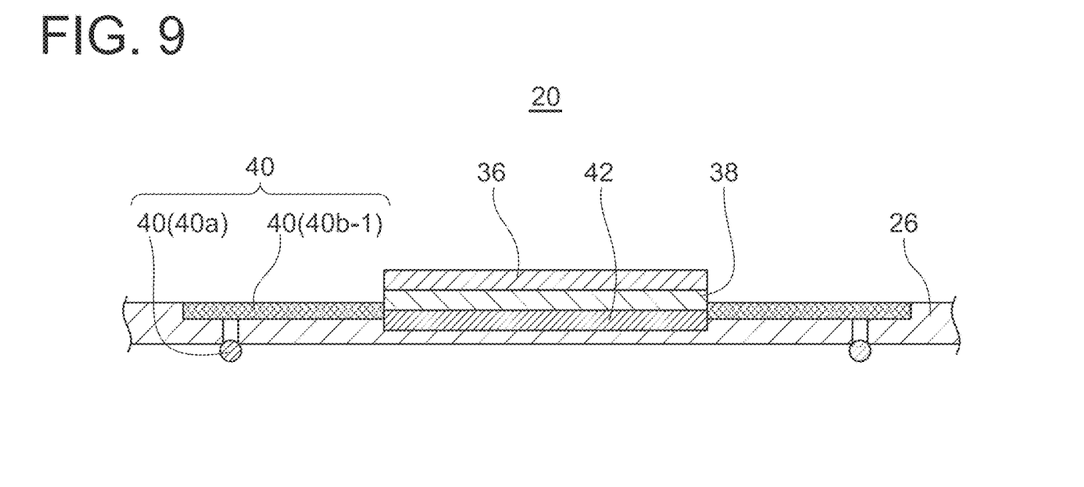
FIG. 9 is a cross-sectional view where the leading-edge side wall of the wind turbine blade is developed according to an embodiment.

FIGS. 7 to 9 are each a cross-sectional view cut along a chord length direction to show a linearly developed leading-edge side wall of the blade body 26 internally including a hollow portion. In an embodiment, as shown in FIG. 7, the conductive part 40 includes a metallic layer 40(40b) formed on the surface of the blade body 26, and the metallic layer 40(40b) is connected to the sprayed film 38. The metallic layer 40(40b) is formed by a metallic material having a low electrical resistivity. Forming the metallic layer 40(40b) having the low electrical resistivity on the surface of the blade body 26, it is possible to increase a conductive property of a conducting path between the sprayed film 38 and the conductive part 40. Thus, it is possible to rapidly flow the lightning strike current charging the sprayed film 36 to the side of the ground G via the sprayed film 38 and the metallic layer 40(40b).

Furthermore, in an embodiment, as shown in FIG. 7, the metallic layer 40(40b) is connected to the down-conductor 40(40a), and the conductive part 40 is constituted by the down-conductor 40(40a) and the metallic layer 40(40b). Thus, it is possible to rapidly flow the lightning strike current charging the sprayed film 36 to the side of the ground G via the metallic layer 40(40b) and the down-conductor 40(40a).

The metallic layer 40(40b) only needs to contact at least the sprayed film 38. However, in the embodiment shown in FIG. 7, the metallic layer 40(40b) is in surface contact with the lower surface of the sprayed film 38 in at least a partial region of the length of the sprayed film 38 in the chord length direction of the blade body 26. Thus, it is possible to improve the conductive property between the sprayed film 38 and the metallic layer 40(40b), making it possible to rapidly flow the lightning strike current charging the sprayed film 36 to the side of the ground G.

The contact area between the sprayed film 38 and the metallic layer 40(40b) is preferably large as much as possible. For example, in FIG. 7, a length $L_2$ in a blade length direction of a region where the metallic layer 40(40b) is in surface contact with the lower surface of the sprayed film 38 is preferably $L_1/3 \leq 2 L_2$ relative to a total length $L_1$ of the sprayed film 38 in the chord length direction. Thus overlapping the sprayed film 38 and the metallic layer 40(40b), it is possible to maintain the conductive property between the sprayed film 38 and the metallic layer 40(40b) high.

In an embodiment, the metallic layer 40(40b) is formed by copper, a copper alloy, aluminum, or an aluminum alloy. As the aluminum alloy, for example, duralumin can be applied. Forming the metallic layer 40(40b) by such a material having the low electrical resistivity, it is possible to easily flow the lightning strike current charging the sprayed film 36 to the side of the ground G and to improve an effect of releasing the lightning strike current charging the sprayed film 36.

In an embodiment, as shown in FIGS. 8A, 8B, and 9, the metallic layer 40(40b) is formed by a strip-shaped metal mesh or a metal foil. The metallic layer 40(40b) shown in these drawings is formed by a metal mesh 40(40b-1), as an example. According to the present embodiments, using the metal foil or the metal mesh 40(40b-1) as the metallic layer 40(40b), it is possible to further improve a joint strength between the blade body 26 and the metallic layer 40(40b).

The embodiment of FIG. 8A shows an example in which the sprayed film 38 enters between the blade body 26 and the metallic layer 40(40b), and the embodiment of FIG. 8B shows an example in which the sprayed film 38 is filled between end portions of a pair of metallic layers 40(40b) with the same thickness as that of the metallic layers 40(40b). In the present embodiments, it is possible to further improve the joint strength between the blade body 26 and the metallic layer 40(40b).

In an embodiment, as shown in FIG. 9, a base layer 42 is formed between the blade body 26 and the sprayed film 38, and the blade body 26 and the sprayed film 38 are coupled via the base layer 42. Intervening the base layer 42 between the blade body 26 and the sprayed film 38, it is possible to improve the joint strength between the blade body 26 and the sprayed film 38. Furthermore, disposing the base layer 42 between the blade body 26 and the sprayed film 38 brings about the advantage of being able to protect the blade body 26 by the base layer 42 when the sprayed film 36 and the sprayed film 38 are thermally sprayed on the surface of the blade body 26, in addition to being able to improve adhesiveness. As the base layer 42, it is possible to use, for example, a nonmetallic thermal spray material such as a resin or a composite material thereof.

Figure 10:
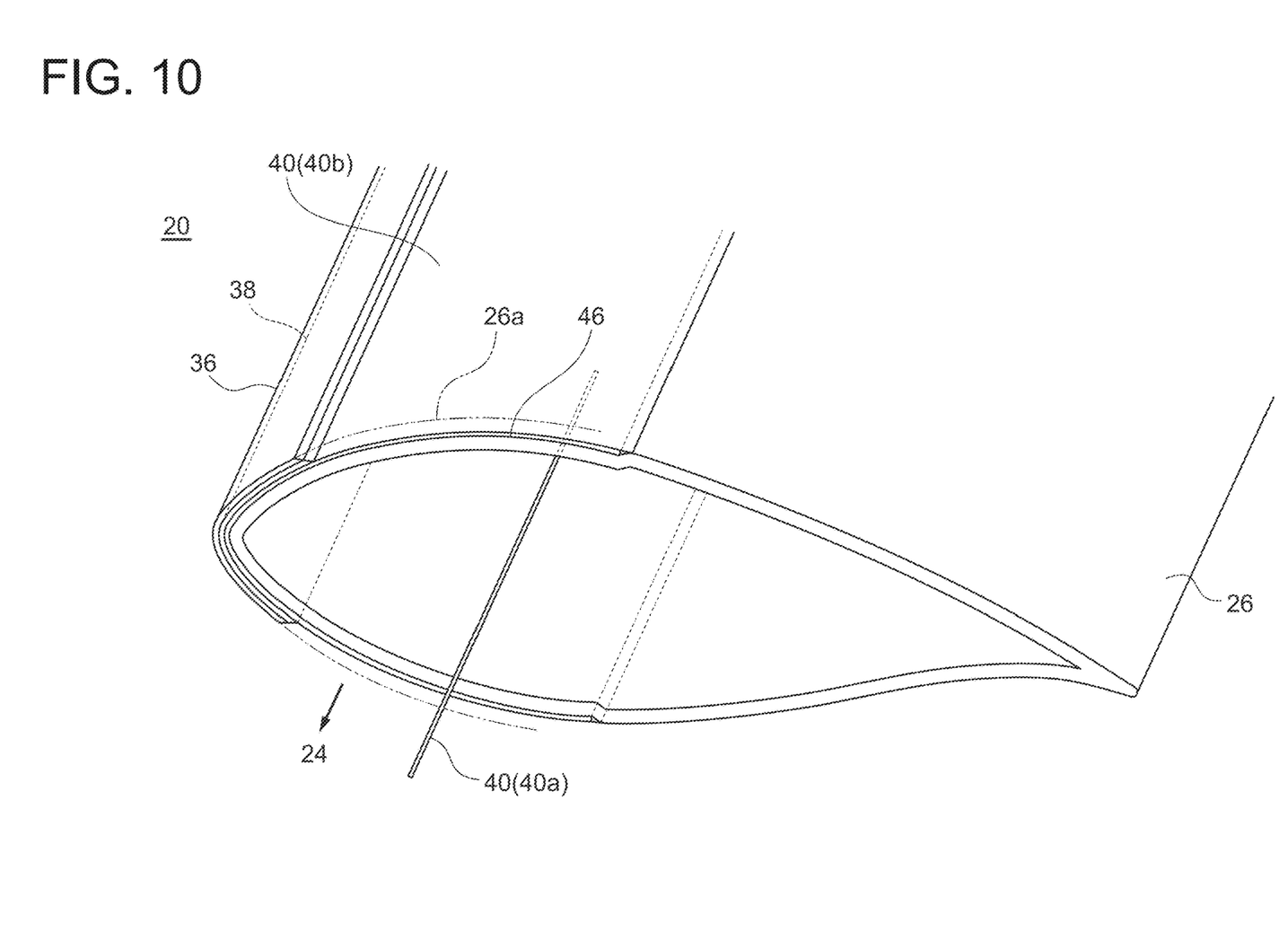
FIG. 10 is a perspective view of the partially cut wind turbine blade according to an embodiment.

In an embodiment, as shown in FIG. 10, a recess 46 is formed in the surface of the blade body 26, and the metallic layer 40(40b) is formed in the recess 46. The surface of the blade body 26 where the metallic layer 40(40b) is not formed and the surface of the metallic layer 40(40b) form a continuous surface without any step. Thus, it is possible to suppress generation of unnecessary turbulence on the surface of the blade body 26 and to suppress a decrease in aerodynamic performance of the wind turbine blade 20. As another embodiment, a recess capable of accommodating not only the metallic layer 40(40b) but also the sprayed films 36 and 38 may be formed in the surface of the blade body 26, and the surface of the sprayed film 36 and the surface of the blade body 26 may form a continuous surface without any step. A double-dotted chain line 26a in FIG. 10 indicates the surface of the blade body 26 in the present embodiment.

In an embodiment, the sprayed film 36 is formed by cermet containing at least one of alumina, tungsten carbide, silicon nitride, silicon carbide, zirconia, or chromium carbide, or a Co alloy. Forming the sprayed film 36 by such a material having the higher heat resistance and wear resistance, it is possible to exert high erosion resistant performance.

In an embodiment, the sprayed film 38 is formed by copper, the copper alloy, aluminum, or the aluminum alloy (such as duralumin). Forming the sprayed film 38 by such a material having the low electrical resistivity, it is possible to rapidly flow the lightning strike current charging the sprayed film 36 to the side of the ground G. Furthermore, since the sprayed film 38 formed by the above-described material has the lower hardness and lower Young modulus than the sprayed film 36, aggression against the blade body 26 is low, and thus adhesiveness to the blade body 26 is high. Therefore, it is possible to suppress separation or dropout of the sprayed film 36 from the blade body 26.

In an embodiment, the total thickness of the sprayed films 36 and 38 is 200 to 2,000 μm. Thus, it is possible to compactly form the sprayed films 36 and 38 on the surface of the blade body 26 while maintaining erosion resistant performance by the sprayed film 36. It is also possible to adjust the thickness highly accurately so any step is not generated between the sprayed films and the surface of the blade body, making it possible to maintain aerodynamic performance of the wind turbine blade high even after the sprayed films are applied.

The thickness of the sprayed film 36 is mainly decided by the tip circumferential velocity of the wind turbine blade, and the thickness of the second sprayed layer sprayed film 38 is mainly decided by, for example, necessity of the electrical resistivity and absorption of unevenness in the surface of the blade body. In an embodiment, the thickness of the sprayed film 36 falls within a range of 100 to 1,000 and the thickness of the sprayed film 38 falls within a range of 100 to 1,000 Thus, it is possible to ensure erosion resistance performance and a coating film strength capable of competing with the tip circumferential velocity of the wind turbine blade. The sprayed film 38 can ensure a cross-sectional area for ensuring a necessary electrical conductivity by decreasing the electrical resistivity. Furthermore, eliminating a risk that unevenness develops in the thickness of the sprayed film 36 due to an influence of unevenness in the surface of the blade body 26 causing unevenness in the sprayed film 38 as well, and erosion resistance and the coating film strength cannot be ensured, it is possible to absorb unevenness with a sufficient thickness. In this case, the thickness of the sprayed film 38 changes depending on a place.

In an embodiment, as shown in FIGS. 1 to 4 and 11, the blade body 26 includes a receptor 50(50a, 50b) as a lightning protection structure. The receptor 50 is connected to the conductive part 40 and the sprayed film 38. Thus, when the lightning strikes on the sprayed film 36 or the receptor 50, it is possible to rapidly flow the lightning strike current charging the sprayed film 36 or the receptor 50 to the ground G via the sprayed film 38 and the conductive part 40.

In an embodiment, as shown in FIG. 3, the receptor 50 is constituted by the tip receptor 50(50a) disposed at the blade tip 22 of the blade body 26. The tip receptor 50(50a) is connected to the sprayed film 38. Furthermore, besides the conductive part 40, a conductive part 52 (second conductive part) extending to the ground G is provided, and the tip receptor 50(50a) is connected to the conductive part 52. Consequently, a conducting path reaching the ground G from the sprayed film 36 via the sprayed film 38 and the conductive part 40, and a conducting path reaching the ground G from the sprayed film 36 via the sprayed film 38, the tip receptor 50(50a), and the conductive part 52 are formed. When the lightning strikes on the sprayed film 36, it is possible to rapidly flow the lightning strike current charging the sprayed film 36 to the ground G via the above-described two conductive paths. Thus, it is possible to effectively suppress damage to the sprayed film 36.

In an embodiment, as shown in FIG. 3, the conductive part 52 is constituted by the down-conductor which has one end connected to the tip receptor 50(50a) and another end extending to the ground G.

In the embodiments shown in FIGS. 3 and 4, at one end of the sprayed film 38, the lower surface of the sprayed film 38 and the upper surface of the tip receptor 50(50a) are in surface contact with each other. The surface contact can improve the conductive property between the sprayed film 38 and the tip receptor 50(50a). However, even without such surface contact, it is possible to hold the conductive property between the sprayed film 38 and the tip receptor 50(50a), as long as they are connected to each other. As another embodiment, when the conductive property is to be further improved, as indicated by a double-dotted chain line 48 in FIG. 3, the sprayed films 36 and 38 may be extended to the blade tip 22 to expand an area where the sprayed film 38 and the tip receptor (50a) are in surface contact with each other.

In an embodiment, the conductive part 52 is configured to have an electrical resistivity which is lower than the electrical resistivity of the sprayed film 38. Thus, it is possible to flow much of the lightning strike current generated by lightning having struck on the tip receptor 50(50a) to the side of the ground G via the conductive part 52, and to suppress the lightning strike current flowing to the side of the ground G via the sprayed film 38 and the conductive part 40(40a, 40b), making is possible to suppress damage to the sprayed films 36 and 38.

Figure 11:
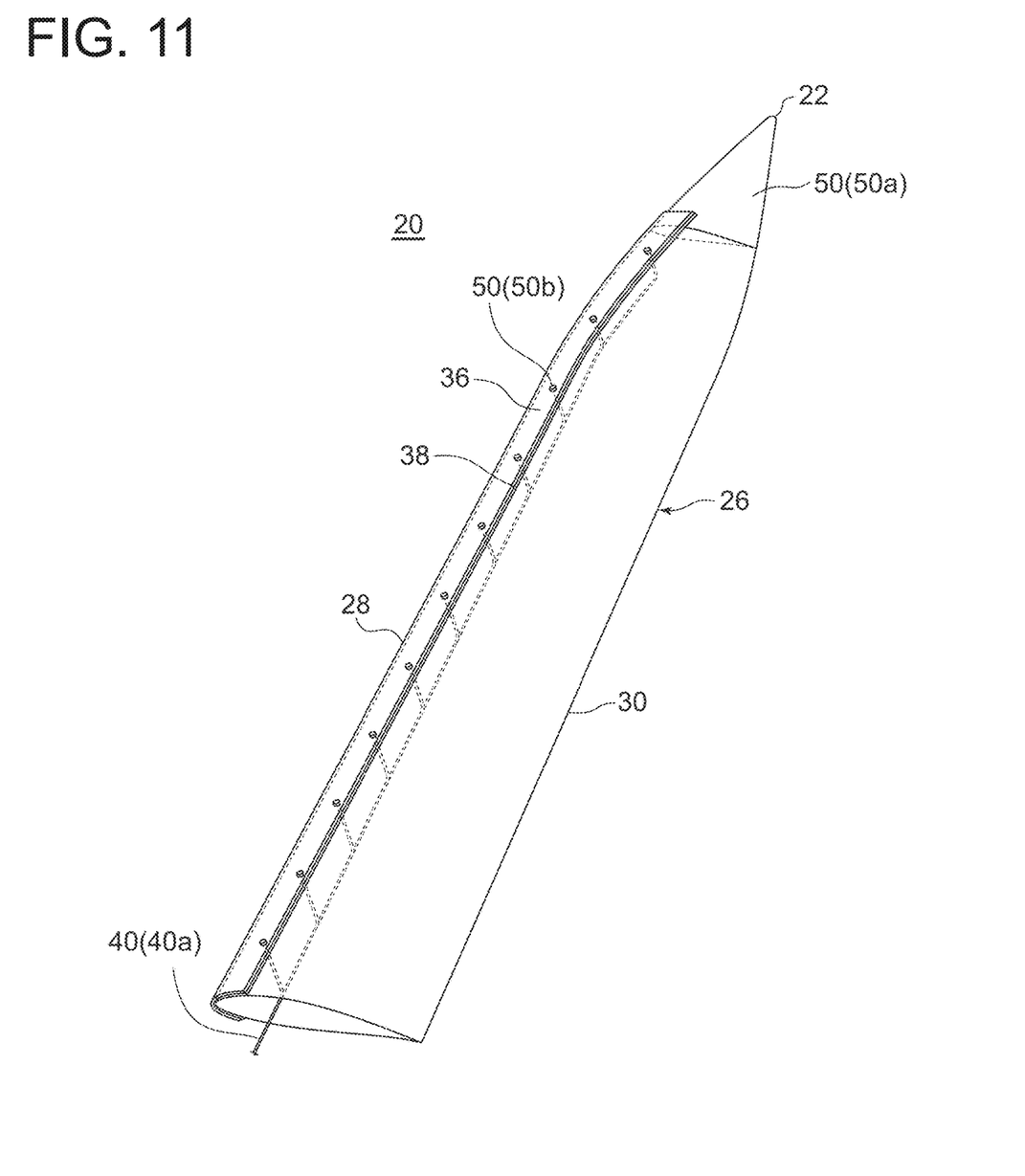
FIG. 11 is a perspective view showing the tip-side portion of the wind turbine blade according to an embodiment.

In an embodiment, as shown in FIG. 11, the receptor 50 includes a plurality of disk receptors 50(50b) disposed separately from each other on the sprayed film 36. In the present embodiment, it is possible to rapidly flow the lightning strike current charging the sprayed film 36 due to lightning strike to the side of the ground G via from the plurality of disk receptors 50(50b).

In the embodiment shown in FIG. 11, since the plurality of disk receptors 50(50b) are scattered over the sprayed film 36 along the blade length direction, it is possible to receive most of lightning strike by the disk receptors 50(50b). Thus, it is possible to decrease the probability of lightning strike on the sprayed film 36 and to suppress damage to the sprayed film 36. Moreover, in the case of lightning strike on the sprayed film 36, it is possible to immediately induce the lightning strike current to the nearest disk receptor 50(50b).

In an embodiment, as shown in FIG. 11, the plurality of disk receptors 50(50b) are connected to the down-conductor 40(40a) embedded in the blade body 26. The another end of the down-conductor 40(40a) extends to the ground G.

Figure 12:
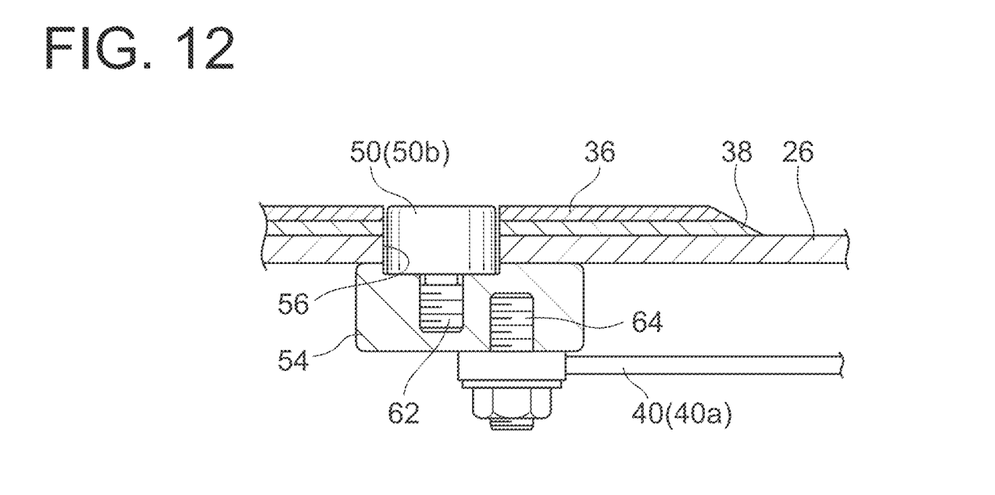
FIG. 12 is a cross-sectional view of a disk receptor according to an embodiment.

FIG. 12 shows an embodiment of the disk receptor 50(50b). The disk receptor 50(50b) shown in FIG. 12 is connected to the down-conductor 40(40a) via a conductive relay disk 54 attached to the back surface of the hollow blade body 26. In the embodiment shown in FIG. 12, the disk receptor 50(50b) is inserted into a through hole 56 formed in the blade body 26, and the sprayed films 36 and 38, and the end surface of the disk receptor 50(50b) is exposed to the outside, forming a continuous surface with the surface of the sprayed film 36. In the present embodiment, since the disk receptor 50(50*b*) is exposed to the outside, it is possible to suppress damage to the sprayed film 36 by having the disk receptor 50(50*b*) struck on lightning.

In an embodiment, as a method of manufacturing the disk receptor 50(50*b*), for example, the FRP-made blade body 26 is manufactured, and then the through hole 56 is formed. Subsequently, the dummy disk receptor 50(50*b*) or the disk receptor 50(50*b*) is inserted into the through hole 56, and then the inserted portion is masked, and thermally sprayed with the sprayed films 36 and 38. As another manufacturing method, the sprayed films 36 and 38 are thermally sprayed after the blade body 26 is manufactured, and then the through hole 56 is formed. The sprayed films 36 and 38 may crack when the through hole 56 is formed, and thus care should be taken.

Figure 13:
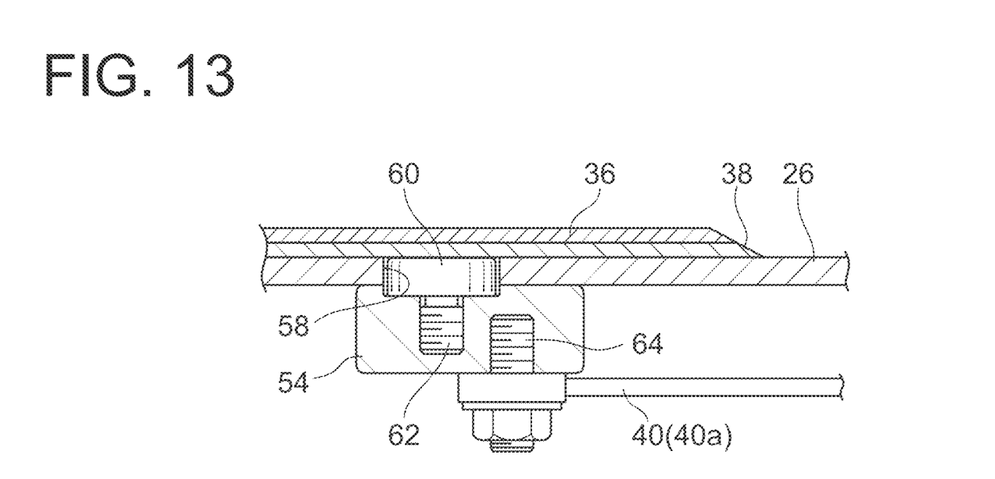
FIG. 13 is a cross-sectional view of a disk receptor according to an embodiment.

In the embodiment shown in FIG. 13, a through hole 58 is formed only in the blade body 26, and an embedded jig 60 formed by a highly conductive material is inserted into the through hole 58. The end surface of the embedded jig 60 is connected to the back surface of the sprayed film 38. Thus, it is possible to rapidly flow the lightning strike current charging the sprayed film 36 due to lightning strike on the sprayed film 36 to the side of the ground G via the embedded jig 60, the relay disk 54, and the down-conductor 40(40*a*).

In the embodiments shown in FIGS. 12 and 13, the disk receptor 50(50*b*) and the embedded jig 60 each have a metallic bolt 62, and a connection end of the down-conductor 40(40*a*) includes a metallic bolt 64. The disk receptor 50(50*b*), the embedded jig 60, and the connection end of the down-conductor 40(40*a*) are connected to the relay disk 54 via the metallic bolts 62 and 64. Thus connecting via the metallic bolts 62 and 64, it is possible to reliably form electrical connection.

The contents described in the above embodiments would be understood as follows, for instance.

1) A wind turbine blade (20) according to an embodiment includes a blade body (26) extending from a blade root (24) toward a blade tip (22) along a blade length direction, a first sprayed layer (36) disposed so as to cover at least a leading edge (28) on a side of the blade tip (22) of the blade body (26), for suppressing erosion of the leading edge (28) of the blade body (26), a second sprayed layer (38) formed between the blade body (26) and the first sprayed layer (36), and having a lower electrical resistivity than the first sprayed layer (36), and a first conductive part (40) for electrically connecting the second sprayed layer (38) to a ground (G).

With the wind turbine blade according to the present disclosure, since the second sprayed layer having the low electrical resistivity is formed between the blade body and the first sprayed layer serving as an erosion resistant film, it is possible to rapidly flow a lightning strike current charging the first sprayed layer to the side of the ground via the second sprayed layer, making it possible to suppress damage to the first sprayed layer.

2) The wind turbine blade (20) according to another aspect is the wind turbine blade according to 1), and the second sprayed layer (38) has a lower hardness and Young modulus than the first sprayed layer (36).

Thus, it is possible to weaken aggression of the second sprayed layer against the blade body and to increase adhesiveness of the second sprayed layer to the blade body, making it possible to suppress separation or dropout of the first sprayed layer from the blade body.

3) The wind turbine blade (20) according to another aspect is the wind turbine blade according to 1) or 2), and the first sprayed layer (36) and the second sprayed layer (38) are disposed on at least a part of a region from the blade tip (22) to one-half of a length of the blade body (26) in a length direction of the blade body (26).

Since erosion depends on a circumferential velocity, the tip side of the wind turbine blade body is most likely to be influenced by erosion and is less likely to be influenced by erosion from the tip side toward the blade-root side. With the above configuration, it is possible to apply the sprayed film in a circumferential velocity range of not less than about 50 m/s, and to cover almost all the region easily influenced by erosion.

4) The wind turbine blade (20) according to still another aspect is the wind turbine blade according to any one of 1) to 3), and the first conductive part (40) includes a metallic layer (40(40*b*)) formed on a surface of the blade body (26), and the metallic layer (40(40*b*)) is connected to the second sprayed layer (38).

With the above configuration, since the metallic layer having the low electrical resistivity is formed on the surface of the blade body, it is possible to increase a conductive property of a conducting path between the second sprayed layer and the first conductive part, making it possible to rapidly flow the lightning strike current charging the first sprayed layer to the side of the ground.

5) The wind turbine blade (20) according to still another aspect is the wind turbine blade according to 4), and the metallic layer (40(40*b*)) is in surface contact with a lower surface of the second sprayed layer (38) in at least a partial region of a length of the second sprayed layer (38) in a chord length direction of the blade body (26).

With the above configuration, since the metallic layer is in surface contact with the lower surface of the second sprayed layer, it is possible to maintain the conductive property between the metallic layer and the second sprayed layer high, making it possible to rapidly flow the lightning strike current charging the first sprayed layer to the side of the ground.

6) The wind turbine blade (20) according to still another aspect is the wind turbine blade according to 4) or 5), and the metallic layer (40(40*b*)) is formed by copper, a copper alloy, aluminum, or an aluminum alloy, and/or is formed by a strip-shaped metal mesh (40(40*b*-1)) or a metal foil.

With the above configuration, since the metallic layer is formed by a material having the high conductive property as described above, it is possible to improve an effect of releasing the lightning strike current charging the first sprayed layer. Moreover, since the metallic layer is formed by the metal mesh or the metal foil, it is possible to improve a joint strength between the metallic layer and the blade body.

7) The wind turbine blade (20) according to still another aspect is the wind turbine blade according to any one of 1) to 6) including a base layer (42) formed between the blade body (26) and the second sprayed layer (38).

With the above configuration, since the base layer is formed between the blade body and the second sprayed layer, it is possible to improve the joint strength between the blade body and the second sprayed layer. Moreover, in a case in which the second sprayed layer formed by, for example, metal is thermally sprayed to the blade body directly, the blade body may be damaged by heat, a shock, or the like at the time of the thermal spray. Thus, a base layer made of, for example, a resin is formed on the blade body in advance, making it possible to protect the blade body.

8) The wind turbine blade (20) according to still another aspect is the wind turbine blade according to any one of 1)

to 7), and the first sprayed layer (36) is formed by cermet containing at least one of alumina, tungsten carbide, silicon nitride, silicon carbide, zirconia, or chromium carbide, or a Co alloy.

With the above configuration, since the first sprayed layer is formed by the material having high heat resistance and wear resistance as described above, it is possible to exert high erosion resistant performance.

9) The wind turbine blade (20) according to still another aspect is the wind turbine blade according to any one of 1) to 8), and the second sprayed layer (38) is formed by copper, a copper alloy, aluminum, or an aluminum alloy.

With the above configuration, since the second sprayed layer is formed by the material having the low electrical resistivity as described above, it is possible to rapidly flow the lightning strike current charging the first sprayed layer to the side of the blade body. Moreover, since the second sprayed layer is formed by the material having the low hardness and Young modulus as described above relative to the first sprayed layer, aggression against the blade body is low, and thus adhesiveness to the blade body is high. Accordingly, it is possible to suppress separation or dropout of the first sprayed layer from the blade body.

10) The wind turbine blade (20) according to still another aspect is the wind turbine blade according to any one of 1) to 9), and a total thickness of the first sprayed layer (36) and the second sprayed layer (38) is not less than 200 μm and not greater than 2,000 μm.

With the above configuration, since the first sprayed layer and the second sprayed layer have the total thickness within the above-described range, it is possible to compactly form the first sprayed layer and the second sprayed layer on the surface of the blade body while maintaining erosion resistant performance by the first sprayed layer. It is also possible to adjust the thickness highly accurately so any step is not generated between the sprayed layers and the surface of the blade body, making it possible to maintain aerodynamic performance of the wind turbine blade high even after the sprayed layers are applied.

11) The wind turbine blade (20) according to still another aspect is the wind turbine blade according to any one of 1) to 10), and the first sprayed layer (36) has a thickness of not less than 100 μm and not greater than 1,000 μm, and the second sprayed layer (38) has a thickness of not less than 100 μm and not greater than 1,000 μm.

The thickness of the first sprayed layer is mainly decided by the tip circumferential velocity of the wind turbine blade, and the thickness of the second sprayed layer is mainly decided by, for example, necessity of the electrical resistivity and absorption of unevenness in the surface of the blade body. With the above configuration, since the first sprayed layer has the above-described thickness, it is possible to ensure erosion resistance and a coating film strength capable of competing with the tip circumferential velocity of the wind turbine blade. Moreover, since the second sprayed layer has the above-described thickness, it is possible to ensure a cross-sectional area for ensuring a necessary electrical conductivity by decreasing the electrical resistivity. Furthermore, eliminating a risk that unevenness develops in the thickness of the first sprayed flayer due to an influence of unevenness in the surface of the blade body causing unevenness in the second sprayed layer as well, and erosion resistance and the coating film strength cannot be ensured, it is possible to absorb unevenness with a sufficient thickness.

12) The wind turbine blade (20) according to still another aspect is the wind turbine blade according to any one of 1) to 11), and the blade body (26) includes a receptor (a tip receptor 50(50a) and a disk receptor 50(50b)) connected to the first conductive part (40), and the receptor (50) is connected to the second sprayed layer (38).

With the above configuration, since the receptor is connected to the second sprayed layer and the first conductive part, when lightning strikes on the first sprayed layer or the receptor, it is possible to rapidly flow the lightning strike current charging the first sprayed layer or the receptor to the side of the ground via the second sprayed layer and the first conductive part.

13) The wind turbine blade (20) according to still another aspect is the wind turbine blade according to 12), and the receptor (50) includes a tip receptor (50(50a)) disposed at the blade tip (22) of the blade body (26), and the tip receptor (50(50a)) is connected to the second sprayed layer (38), and the wind turbine blade (20) includes a second conductive part (52) for electrically connecting the tip receptor (50 (50a)) and the ground (G).

With the above configuration, the lightning strike current obtained by lightning strike on the first sprayed layer can form two conducting paths of a conducting path flowing to the side of the ground via the second sprayed layer and the first conductive part, and a conducting path flowing to the side of the ground from the tip receptor via the second conductive part. Thus, it is possible to rapidly flow the lightning strike current charging the first sprayed layer to the side of the ground. Thus, it is possible to effectively suppress damage to the first sprayed layer.

14) The wind turbine blade (20) according to still another aspect is the wind turbine blade according to 13), and the second conductive part (52) is configured to have an electrical resistivity which is lower than an electrical resistivity of the second sprayed layer (38).

With the above configuration, it is possible to flow the lightning strike current generated by lightning strike on the tip receptor to the side of the ground via the second conductive part. Therefore, it is possible to suppress the lightning strike current flowing to the side of the ground via the second sprayed layer, making it possible to suppress damage to the first sprayed layer and the second sprayed layer.

15) The wind turbine blade (20) according to still another aspect is the wind turbine blade according to any one of 12) to 14), and the receptor (50) includes a plurality of disk receptors (50(50b)) disposed separately from each other on the first sprayed layer (36).

With the above configuration, since the plurality of disk receptors are disposed separately from each other on the first sprayed layer, it is possible to induce lightning strike to the plurality of disk receptors. Therefore, it is possible to decrease the number of lightning strikes on the first sprayed layer, making it possible to suppress damage to the first sprayed layer. Moreover, in the case of lightning strike on the first sprayed layer, it is possible to immediately induce the lightning strike current to the nearest disk receptor.

The invention claimed is:

1. A wind turbine blade, comprising:
a blade body extending from a blade root toward a blade tip along a blade length direction;
a first sprayed layer disposed so as to cover at least a leading edge on a side of the blade tip of the blade body, for suppressing erosion of the leading edge of the blade body;
a second sprayed layer formed between the blade body and the first sprayed layer, and having a lower electrical resistivity than the first sprayed layer;

two metallic layers spaced apart from each other in a chord length direction of the blade body, each being disposed on a surface of the blade body and under a part of the second sprayed layer to be electrically connected to the second sprayed layer; and two conductive parts disposed on a side opposite to the surface of the blade body and electrically connected to the two metallic layers, respectively, for grounding, wherein the second sprayed layer is formed by copper, a copper alloy, aluminum, or an aluminum alloy, and has a lower hardness and Young modulus than the first sprayed layer.

2. The wind turbine blade according to claim 1,
wherein the first sprayed layer and the second sprayed layer are disposed on at least a part of a region from the blade tip to one-half of a length of the blade body in the blade length direction of the blade body.

3. The wind turbine blade according to claim 1,
wherein the metallic layer is formed by copper, a copper alloy, aluminum, or an aluminum alloy, and/or is formed by a strip-shaped metal mesh or a metal foil.

4. The wind turbine blade according to claim 1,
wherein the first sprayed layer is formed by:
cermet containing at least one of alumina, tungsten carbide, silicon nitride, silicon carbide, zirconia, or chromium carbide; or
a Co alloy.

5. The wind turbine blade according to claim 1,
wherein a total thickness of the first sprayed layer and the second sprayed layer is not less than 200 μm and not greater than 2,000 μm.

6. The wind turbine blade according to claim 1,
wherein the first sprayed layer has a thickness of not less than 100 μm and not greater than 1,000 μm, and
wherein the second sprayed layer has a thickness of not less than 100 μm and not greater than 1,000 μm.

7. The wind turbine blade according to claim 1,
wherein the blade body includes a receptor connected to the metallic layers, and
wherein the receptor is connected to the second sprayed layer.

8. The wind turbine blade according to claim 7,
wherein the receptor includes a tip receptor disposed at the blade tip of the blade body, and the tip receptor is connected to the second sprayed layer, and
wherein the wind turbine blade further comprises a conductive part for electrically connecting the tip receptor to a ground.

9. The wind turbine blade according to claim 8,
wherein the conductive part is configured to have an electrical resistivity which is lower than an electrical resistivity of the second sprayed layer.

10. A wind turbine blade, comprising:
a blade body extending from a blade root toward a blade tip along a blade length direction;
a first sprayed layer disposed so as to cover at least a leading edge on a side of the blade tip of the blade body, for suppressing erosion of the leading edge of the blade body;
a second sprayed layer formed between the blade body and the first sprayed layer, and having a lower electrical resistivity than the first sprayed layer;
a base layer formed between the blade body and the second sprayed layer to couple the second sprayed layer and the blade body;
two metallic layers spaced apart from each other in a chord length direction of the blade body, each being contacted to the second sprayed layer and the base layer to be electrically connected thereto;
two conductive parts disposed on a side opposite to a surface of the blade body and electrically connected to the two metallic layers, respectively, for grounding,
wherein the second sprayed layer is formed by copper, a copper alloy, aluminum, or an aluminum alloy, and has a lower hardness and Young modulus than the first sprayed layer.

11. A wind turbine blade, comprising:
a blade body extending from a blade root toward a blade tip along a blade length direction;
a first sprayed layer disposed so as to cover at least a leading edge on a side of the blade tip of the blade body, for suppressing erosion of the leading edge of the blade body;
a second sprayed layer formed between the blade body and the first sprayed layer, and having a lower electrical resistivity than the first sprayed layer; and
a first conductive part for electrically connecting the second sprayed layer to a ground,
wherein the second sprayed layer is formed by copper, a copper alloy, aluminum, or an aluminum alloy, and has a lower hardness and Young modulus than the first sprayed layer,
wherein the blade body includes a receptor connected to the first conductive part,
wherein the receptor is connected to the second sprayed layer, and
wherein the receptor includes a plurality of disk receptors disposed separately from each other on the first sprayed layer.

* * * * *